US011086493B2

(12) United States Patent
Badr et al.

(10) Patent No.: US 11,086,493 B2
(45) Date of Patent: Aug. 10, 2021

(54) IDENTIFYING AND CONTROLLING SMART DEVICES

(71) Applicant: Google LLC, Mountain View, CA (US)

(72) Inventors: Ibrahim Badr, Zurich (CH); Gokhan H. Bakir, Zurich (CH); Roland Peter Kehl, Gachnang (CH); Nils Grimsmo, Gachnang (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/905,245

(22) Filed: Jun. 18, 2020

(65) Prior Publication Data

US 2020/0319765 A1     Oct. 8, 2020

Related U.S. Application Data

(63) Continuation of application No. 16/017,394, filed on Jun. 25, 2018, now Pat. No. 10,725,629.

(51) Int. Cl.
*G06F 3/0484* (2013.01)
*G06F 9/451* (2018.01)
(Continued)

(52) U.S. Cl.
CPC .......... *G06F 3/0484* (2013.01); *G06F 3/0482* (2013.01); *G06F 3/167* (2013.01);
(Continued)

(58) Field of Classification Search
CPC ...... G06F 3/0484; G06F 9/453; G06F 3/0482; G06F 3/167; G06K 9/00671; G08C 17/02
See application file for complete search history.

(56) References Cited

U.S. PATENT DOCUMENTS 9,165,406 B1    10/2015    Gray et al.
9,691,272 B2    6/2017     Hou et al.
(Continued)

FOREIGN PATENT DOCUMENTS

EP          3147826         3/2017
WO          WO2011/009069   1/2011
WO          WO2017/116637   7/2017

OTHER PUBLICATIONS blog.prototypr.io, "How I designed Otomate—Smart Home App," Jan. 17, 18, Retrieved on Jun. 22, 2018, URL<https://blog.prototypr.io/how-i-designedotomate-smart-home-app-7995ebalebc> 11 pages.
(Continued)

*Primary Examiner* — David Phantana-angkool
(74) *Attorney, Agent, or Firm* — Dority & Manning, P.A.

(57) ABSTRACT

Methods, systems, and apparatus for controlling smart devices are described. In one aspect a method includes receiving image data for an image captured by a camera of a mobile device of a user and determining that the image depicts at least one of a smart device or a physical control for the smart device. In response to determining that that the image depicts a smart device or a physical control for the smart device, identifying one or more user interface controls for controlling the smart device, and generating and presenting, at a display of the mobile device, the one or more user interface controls for controlling the smart device. The method can further include detecting, at the display of the mobile device, user interaction with at least one of the one or more user interface controls, and controlling the smart device based on the detected user interaction.

20 Claims, 6 Drawing Sheets

(51) Int. Cl.
*G06F 3/0482* (2013.01)
*G06F 3/16* (2006.01)
*G06K 9/00* (2006.01)
*G08C 17/02* (2006.01)
G06T 19/00 (2011.01)
H04W 88/02 (2009.01)

(52) U.S. Cl.
CPC ......... *G06F 9/453* (2018.02); *G06K 9/00671*
(2013.01); *G08C 17/02* (2013.01); *G06T 19/006* (2013.01); *G08C 2201/30* (2013.01); *H04W 88/02* (2013.01)

(56) References Cited

U.S. PATENT DOCUMENTS

| | | | | |
|---|---|---|---|---|
| 10,474,297 | B2* | 11/2019 | Zhang | G06F 3/04886 |
| 10,504,290 | B2* | 12/2019 | Rogers | G06F 3/0484 |
| 10,522,117 | B2* | 12/2019 | Huang | G06K 9/46 |
| 10,620,721 | B2* | 4/2020 | Goldberg | G06F 3/012 |
| 10,701,661 | B1* | 6/2020 | Coelho | G01S 13/74 |
| 10,860,100 | B2* | 12/2020 | Osterhout | G06F 1/163 |
| 10,922,583 | B2* | 2/2021 | Kaehler | G06F 3/011 |
| 2012/0133580 | A1* | 5/2012 | Kirby | G06K 9/00389 345/156 |
| 2014/0027645 | A1 | 1/2014 | Filson et al. | |
| 2014/0049558 | A1* | 2/2014 | Krauss | G02B 27/017 345/633 |
| 2014/0313867 | A1 | 10/2014 | Lee et al. | |
| 2015/0309316 | A1* | 10/2015 | Osterhout | G06F 3/0346 345/8 |
| 2016/0313902 | A1* | 10/2016 | Hill | G06T 19/006 |
| 2018/0063569 | A1 | 3/2018 | Yu | |
| 2018/0137642 | A1* | 5/2018 | Malisiewicz | G06N 3/0445 |
| 2018/0151060 | A1* | 5/2018 | Griffin | G08C 23/04 |
| 2018/0157398 | A1* | 6/2018 | Kaehler | G06N 3/02 |
| 2018/0350149 | A1 | 12/2018 | Dandekar et al. | |
| 2019/0043260 | A1 | 2/2019 | Anderson | |
| 2019/0114061 | A1 | 4/2019 | Daniels et al. | |
| 2019/0121522 | A1 | 4/2019 | Davis et al. | |
| 2019/0171170 | A1 | 6/2019 | Becea et al. | |
| 2019/0391716 | A1* | 12/2019 | Badr | G06K 9/00671 |
| 2020/0043179 | A1* | 2/2020 | Chauvin | G06T 7/74 |
| 2020/0143125 | A1* | 5/2020 | Mars | G06Q 20/204 |

OTHER PUBLICATIONS

International Search Report and Written Opinion in International Application No. PCT/US2019/037171, dated Oct. 16, 2019, 18 pages.
Moje et al. "Smart Device Control Using Augmented Reality," International Journal of Innovative Research in Electrical Electronics, Instrumentation and Control Engineering, vol. 3, Issue 4, Apr. 2015, 4 pages.
mysmahome.com, "Hayo Brings in Augmented Reality to Control Smart Home Devices," Feb. 10, 2017, Retrieved on Jun. 22, 2018, URL<https://mysmahome.com/news/33173/hayo-brings-augmented-reality-control-smart-home-devices/>, 8 pages.
mysmahome.com, "Can AR be the Thing of the Future in a Connected Home Space," Jul. 27, 2016, retrieved on Jun. 22, 2018, URL <https :// mysmahome. com/news/6111/ can-ar-be-the-thing% c2 %90-of-the-future-in-aconnected-home-space/>, 7 pages.
digitaltrends.com, "HoloLens Concept Lets You Control Your Smart Home via Augmented Reality," Jul. 26, 2016, retrieved on Jun. 22, 2018, URLhttps://www.digitaltrends.com/cool-tech/hololens-hackathon-smart-home/, 5 pages.
International Preliminary Report on Patentability for Application No. PCT/US2019/037171, dated Jan. 7, 2021, 11 pages.

\* cited by examiner

US 11,086,493 B2

IDENTIFYING AND CONTROLLING SMART DEVICES

PRIORITY CLAIM

The present application is a continuation of U.S. application Ser. No. 16/017,394 having a filing date of Jun. 25, 2018. Applicant claims priority to and the benefit of each of such applications and incorporate all such applications herein by reference in its entirety.

BACKGROUND

Many mobile devices, such as smartphones, come equipped with a camera for capturing pictures and digital images. Mobile devices also provide access to a wide variety of information. This information may be viewed in web browsers or native applications running on a mobile device. Users can also use the images to obtain additional information related to an object or location depicted in the images.

A virtual assistant is an application that performs tasks or services for a user. A virtual assistant can be integrated in a voice assistant device (e.g., a smart speaker or other voice controlled device). Some virtual assistants also act as smart devices that control other smart devices, such as home automation devices. For example, a user can control the operation of a light by providing a voice command to a voice assistant device that is configured to control the light.

SUMMARY

This specification describes technologies relating to identifying a smart device and presenting one or more user interface controls for controlling an identified smart device.

In general, one innovative aspect of the subject matter described in this specification can be embodied in methods that include receiving image data for an image captured by a camera of a mobile device of a user, determining, based on the image data, that the image depicts at least one of a smart device or a physical control for the smart device, in response to determining that that the image depicts at least one of a smart device or a physical control for the smart device, identifying one or more user interface controls for controlling the smart device, generating and presenting, at a display of the mobile device, the one or more user interface controls for controlling the smart device, detecting, at the display of the mobile device, user interaction with at least one of the one or more user interface controls, and controlling the smart device based on the detected user interaction. Other implementations of this aspect include corresponding apparatus, methods, systems, and computer programs, configured to perform the actions of the methods, encoded on computer storage devices.

These and other implementations can each optionally include one or more of the following features. In some aspects controlling the smart device includes transmitting data to a virtual assistant control device operably connected to the smart device, the data causing the virtual assistant control device to send an operation corresponding to the detected user interaction to the smart device to perform the operation.

In some aspects, determining, based on the image data, that the image depicts at least one of a smart device or a physical control for the smart device includes determining that the image depicts a virtual assistant control device that is configured to control other smart devices. In some aspects, the method can further include determining that the mobile device at a time the image is presented at the mobile device is able to control the virtual assistant control device. In some aspects determining that the mobile device at a time the image is presented at the mobile device is able to control the virtual assistant control device includes determining that the virtual assistant control device is a particular virtual assistant control device registered with an account of the user by determining that the mobile device, at the time the image is presented at the user device, is within a threshold distance of the particular virtual assistant control device registered with the account of the user. In some aspects, the method can further include determining to present the one or more user interface controls for controlling the smart device in response to determining that the mobile device at a time the image is presented at the mobile device is able to control the virtual assistant control device.

In some aspects determining, based on the image data, that the image depicts at least one of the smart device or the physical control for the smart device includes determining that the image depicts an image of a virtual assistant control device of the user. In some aspects, the virtual assistant control device includes a virtual assistant smart speaker device that receives voice commands from the user and provides information to the user using a speaker of the virtual assistant smart speaker device. In some aspects, identifying one or more user interface controls for controlling the smart device includes determining a task or service the virtual assistant smart speaker device is currently performing, and selecting one or more user interface controls for controlling the task or service.

In some aspects, generating and presenting, at the mobile device, the one or more user interface controls for controlling the smart device includes superimposing the one or more user interface controls in augmented reality over a field of view of a viewfinder of a camera of the mobile device.

In some aspects, identifying, in response to determining that that the image depicts at least one of a smart device or a physical control for the smart device, one or more user interface controls for controlling the smart device includes obtaining a registration file for the smart device, wherein the registration file includes data that specifies a type of smart device, and an available user interface controls for controlling the smart device.

The subject matter described in this specification can be implemented in particular embodiments so as to realize one or more of the following advantages. By facilitating a platform through which smart devices are identified in images and virtual user interface controls are presented for the identified smart devices, the platform allows for the presentation of virtual user interface controls that are customized or adapted to the objects, their capabilities, and/or the context in which the object is currently operating.

With conventional user interfaces, a user may need to scroll around and switch views many times to find the right data/functionality or provide multiple voice commands to a voice assistant device. The virtual assistant application of the present system can present virtual user interface controls for a smart device while a user is viewing the smart device on the mobile device (e.g., using augmented reality techniques) without having to find a separate application for each smart device. For example, the user can point a camera of a mobile device at a virtual assistant control device (e.g., a voice assistant device such as a smart speaker) at the user's home, office, or other location while the virtual assistant control device is playing music. The virtual assistant application (e.g., alone or with the help of a remote system) can detect the virtual assistant control device based on image data received from the camera and present user interface controls that enable the user to control the audio currently being played. By selecting the user interface controls based on smart devices detected in image data and the current mode or actions of the smart devices, the virtual assistant application can provide customized user interfaces that provide more efficient and effective control of the smart devices. For example, attempting to adjust the volume or playback of music using voice controls can require multiple voice commands and adjustments by the smart speaker to get the appropriate change in volume or playback. User interface controls presented by a mobile device can enable the user to more quickly and more intuitively make the same changes.

Systems and techniques described herein can recognize a smart device from image data (e.g., a single frame image, continuous video, a stream of images, etc.) from the camera of the mobile device. Once a smart device has been identified, the mobile device can index the results. This prevents the user from having to make multiple requests which, in turn, reduces the number of times computing system(s) process the requests to identify the smart device and determine which user interface controls should be presented for the particular smart device application (e.g. audio controls for music playback, light switch controls for a light, etc.). Aggregated over many users, this can significantly improve the functioning of computers of a virtual assistant management system that selects the user interface controls by reducing the processing demands placed on the computers. As the virtual assistant management system may be accessed over a network, reducing the number of requests can also reduce the amount of bandwidth consumed, allowing bandwidth for other network traffic and/or increasing the speed of the network.

By selecting the appropriate user interface controls based upon the smart device, the user is not burdened with having to select controls each time the user points the camera of the mobile device at the same smart device. This allows for quicker requests by the user and more flexibility for the user. For example, by using the virtual assistant application, the user can hold the mobile device such that the camera is pointing at a smart device and be presented with user interface controls to control certain features of the smart device without having to further interact with the mobile device or smart device. Systems and techniques described herein therefore provide a guided human-machine interaction process for controlling a smart device.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1A:
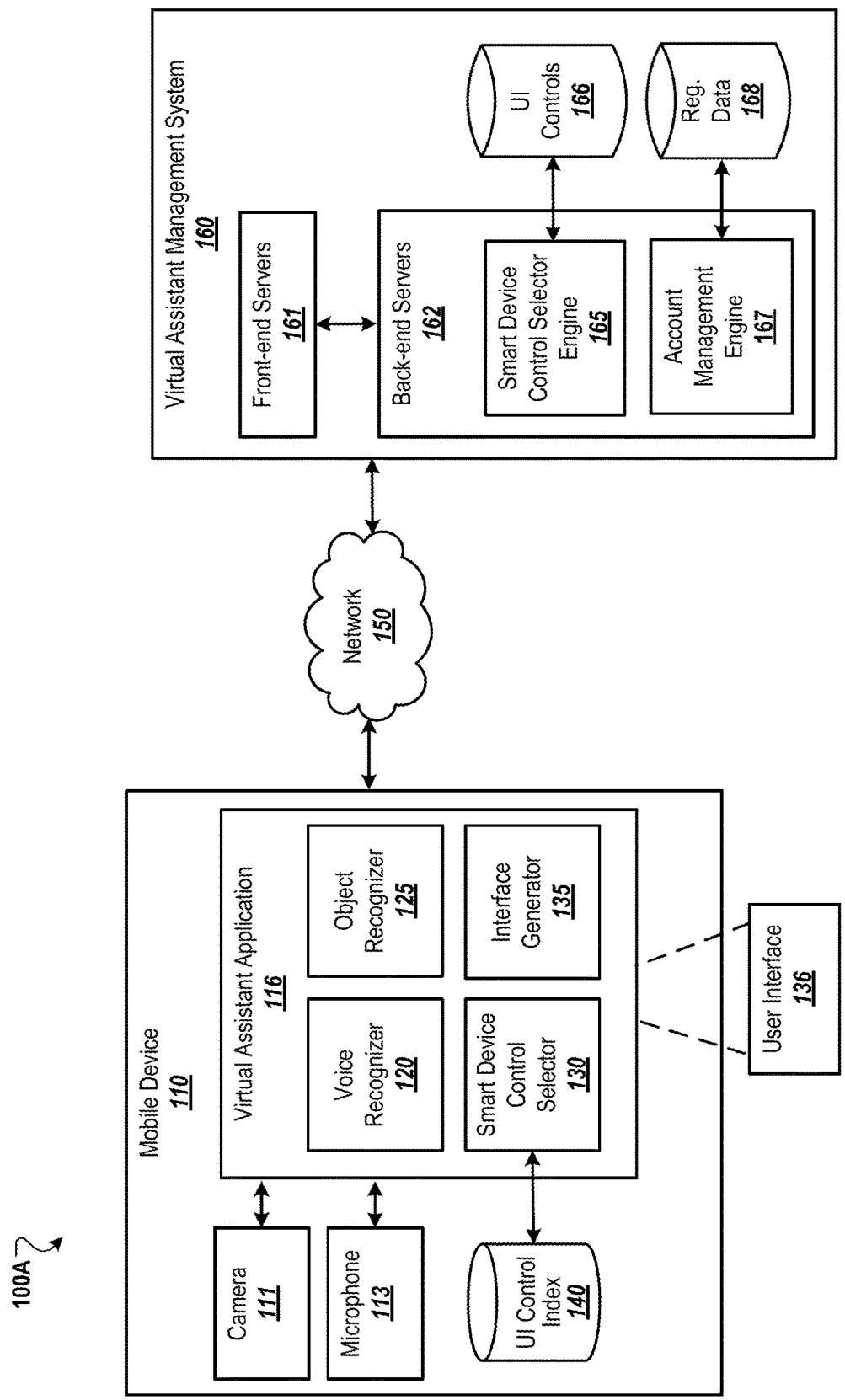
FIG. 1A is a block diagram of an example environment in which a virtual assistant application identifies smart devices and presents user interface controls for controlling the smart devices.

Systems, methods, and computer program products are described for using a virtual assistant application to identify a smart device (or physical controls for a smart device) based on image data (e.g., a single frame image, continuous video, a stream of images, etc.) and, for each identified smart device, presenting one or more user interface controls for controlling the smart device. For example, a smart device or physical controls for a smart device may be identified (e.g. recognized using object recognition techniques) in image data that represents the viewfinder of the mobile device's camera. In response, user interface controls for controlling the smart device can be presented, e.g., within the viewfinder using augmented reality techniques, such that the user can control the smart device. A smart device is an electronic device that is connected to other devices over one or more networks. The smart devices can operate autonomously and interactively/or with other smart devices. Example smart devices include virtual assistant control devices (e.g., voice control devices such as smart speakers), home automation devices (e.g., smart lights, smart appliances, thermostats, etc.), smart televisions, and smart radios, to name a few. A virtual assistant control device is an electronic device that includes an integrated virtual assistant that performs tasks and/or services for a user and that controls other smart devices. An example virtual assistant control device is a smart speaker that performs tasks and controls other smart devices in response to voice commands.

For example, a user can point the camera of a mobile device at a smart speaker and view user interface controls for controlling the smart speaker or other smart devices for which the smart speaker has been configured to control (e.g., other smart device registered with an account of the user). In another example, the user can point the camera of the mobile device at a smart light or light switch and view user interface controls for adjusting the smart light.

In some aspects, the mobile device connects to a smart device through a virtual assistant control device (e.g., a smart speaker), where each has been connected to the same network. In some aspects, mobile device can connect to a smart device without connecting to or through a virtual assistant control device, e.g., where the particular smart device is configured to communicate data over the same network (e.g., wireless network) as the mobile device.

According to some aspects, a user can register a virtual assistant control device with an account of the user. The user can also register other smart devices with the account so that the virtual assistant control device can control each registered smart device. In another example, the user can configure the virtual assistant control device to control one or more smart devices, e.g., at the virtual assistant control device. The user can then request the virtual assistant control device to play music on its own speaker, or request the virtual assistant control device to turn off the lights in a certain room, if the light is a smart device (or connected to a smart device) that is registered with the user's account or otherwise controlled by the virtual assistant control device. The virtual assistant control device can control the smart device by sending control data to the smart device over a wireless network or by sending the control data to a virtual assistant management system that relays the control data to the smart device.

Virtual assistant applications described herein can determine whether a smart device detected in the image data (such as the virtual assistant control device or the smart light switch) is associated with a user of the mobile device by determining that a location of the mobile device at the time the image is presented at the mobile device (or a time at which the image was captured) is within a threshold distance of the virtual assistant control device registered with an account of the user. For example, the system can use geographic location of the mobile device and the location of the virtual assistant control device that is registered with the account of the user to determine whether the particular smart device represented by the image data is a smart device of the user. The virtual assistant application can then, through generated interface controls, control the smart device using the connection between the virtual assistant control device and the particular smart device. An application for the smart device can be used to configure the particular smart device and connect it to a network, such as a WiFi network. An application for the virtual assistant control device can be used to connect and control the smart devices on the same WiFi network, and further configure the particular smart device (e.g., add a nickname, assign them to a room, etc.).

According to some aspects, the virtual assistant application can connect to a smart device without a virtual assistant control device. For example, the virtual assistant application can determine if the user of the mobile device has access to the home network the smart device is registered to (e.g. permission to access the home network through a WiFi password, or the like). The virtual assistant application system described herein can determine whether a smart device recognized in the image data (such as a smart light switch or smart thermostat) is registered to the user by determining that a location of the mobile device at the time the image is presented at the mobile device (or when the image was captured) is within a location (such as the same network) of the smart device and is registered with an account of the user. For example, the system can use geographic location of the mobile device and access registration files through a virtual assistant management system to determine if the mobile device is allowed to access the particular smart device. The registration file includes data about a particular smart device, including, but not limited to, identification and control information. A virtual assistant application can use the data in the registration file to communicate with and control the particular smart device.

The user interface controls, described herein, can be generated and presented by a user interface of the mobile device, e.g., by a virtual assistant application executing on the mobile device. The present system can use an augmented reality (AR) module, or the like, to overlay the user interface controls over a live image (e.g., a digital viewfinder) presented by the user interface of the mobile device or over a previously captured image. For example, the user can have a live view of a smart light switch in the viewfinder of the camera of the mobile device, and view virtually the user interface controls superimposed on the live image.

In operation, the virtual assistant application receives image data and location data that specifies the location of a mobile device on which the virtual assistant application is executing. An object recognizer component of the virtual assistant application (or of a remote server) can analyze the image data and generate identified object data. The identified object data specifies the region of the image the object occupies. In some aspects, the object recognizer component can determine if the object is a smart device and embed that information into the identified object data. A smart device control selector of the virtual assistant application (or a remote server) receives the identified object data from the object recognizer component and determines if the image data depicts a specified object, such as a smart device. If a smart device is identified from the identified object data, the smart device control selector receives the location data from the mobile device. The smart device control selector can then determine that a location of the mobile device at the time the image is presented (or image data for the image was captured) is within a threshold distance (e.g., 50 meters, 100 meters, or another appropriate distance) of a location of a virtual assistant control device registered with an account of the user. In some aspects, the system can determine if the smart device is associated with an account of the user, and if the virtual assistant control device is able to control the smart device.

In some aspects, if a smart device is identified from the identified object data, the smart device control selector receives the location data from the mobile device and then processes a registration file to determine if the smart device is registered to an account of the user, if, for example, a voice assistant control device is not found on the network. The registration file can be stored on the user device (if known), or can be accessed through a back end server in the virtual assistant management system, such as a smart device registration engine.

After the smart device control selector determines that a location of the mobile device is within the threshold distance of a location of a virtual assistant control device registered with an account of the user, the smart device control selector identifies (e.g., selects) one or more user interface controls for controlling the smart device and generates interface controls identification data. The interface controls identification data includes data that specifies one or more controls that can control the identified smart device. For example, if the smart device is a light switch, the controls may include an on icon, an off icon, and/or a dimmer. The interface controls identification data is received by the interface generator. For each user interface control(s) specified by the interface controls identification data to belong to the smart device of interest, the interface generator generates presentation data that presents the user interface controls at the user interface.

The image data received can be from live continuous video that is processed in real time, that would, even if the camera moves, continue to identify the object(s) of interest within the field of view of the camera's lens. In some aspects, the image data received can be a single frame shot, or a recorded video.

These features and additional features are described in more detail below.

Figure 1B:
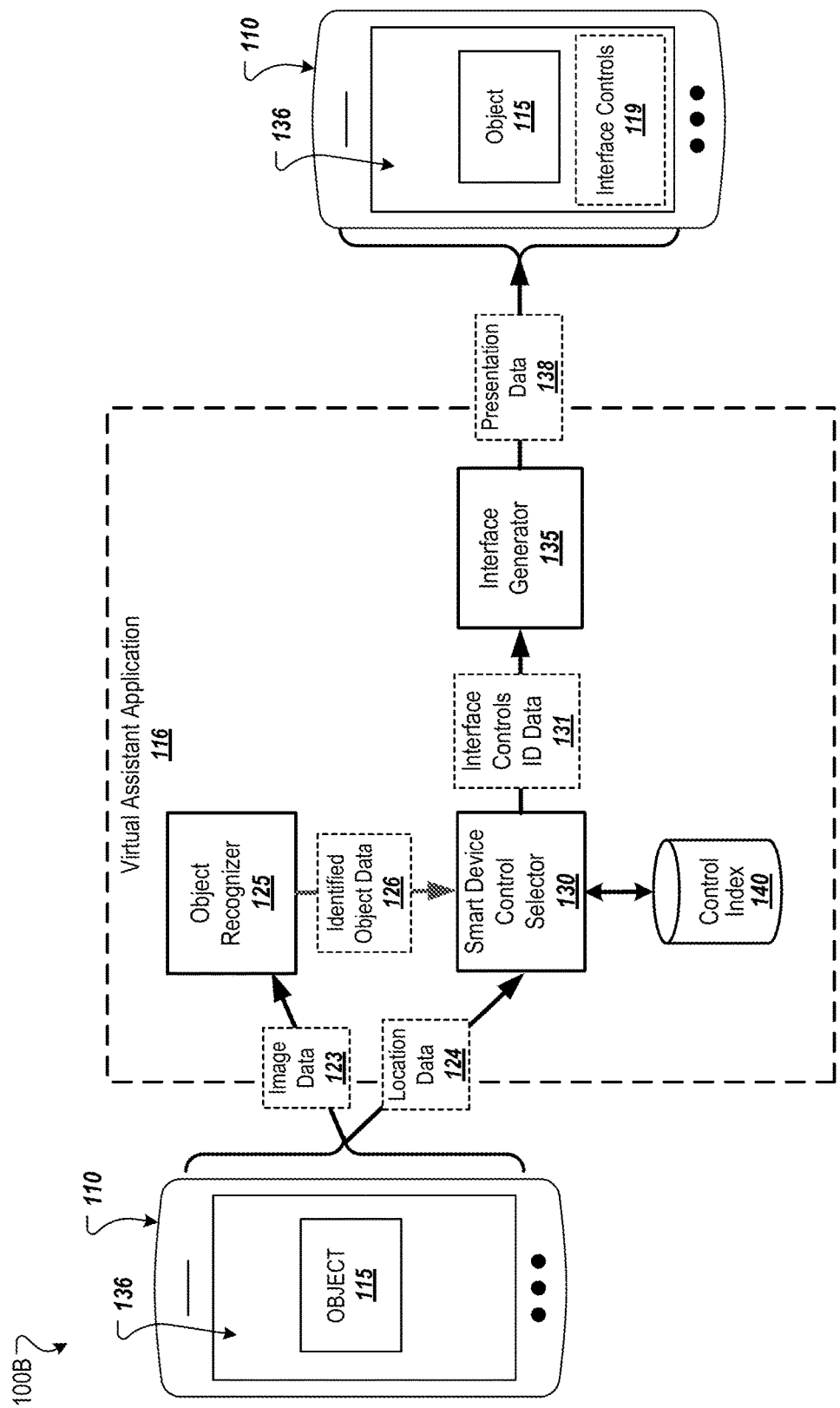
FIG. 1B is an example system flow diagram of an example process in which a virtual assistant application presents user interface controls for identified smart devices.

FIG. 1A is a block diagram of an example environment 100A in which a virtual assistant application 116 identifies smart devices and presents user interface controls for controlling the smart devices. FIG. 1B is an example system flow diagram of an example process in which a virtual assistant application 116 presents user interface controls for identified smart devices.

The virtual assistant application 116 can be installed on and/or executed by a mobile device 110. A mobile device 110 is an electronic device that is capable of sending and receiving data over a data communication network 150. Example mobile devices 110 include smart phones, tablet computing devices, wearable computing devices (e.g., smart watches), and other devices that can send and receive data over the network 150. The network 150 can include a local area network (LAN), a wide area network (WAN), the Internet, a mobile network, or a combination thereof.

The virtual assistant application 116 can be implemented as a native application developed for a particular platform or a particular device. The virtual assistant application 116 can perform tasks or services for a user of the mobile device 110. For example, the virtual assistant application 116 can respond to voice commands of the user (e.g., provide requested information), control smart devices of the user, play content (e.g. music or videos), etc. To make it easier and more efficient for the user to control smart devices, the virtual assistant application 116 can present graphical user interface controls on a display of the mobile device 110.

The virtual assistant application 116 can present user interface controls for smart devices recognized in image data representing the scene in the field of view of a camera 111 of the mobile device 110. For example, the virtual assistant application 116 can identify smart devices and determine whether to present user interface controls for the identified smart devices. The virtual assistant application 116 can determine whether to present user interface controls for an identified smart device based on whether the identified smart device is registered with an account of the user and/or whether the mobile device 110 is within a threshold distance of a virtual assistant control device registered with the account of the user. The virtual assistant application 116 can also select which user interface controls to use for the identified smart device (e.g., audio controls for music, toggle controls for a smart device light switch, and the like) and present an interface with the selected controls, e.g., as a graphic overlay over image data (e.g., objects depicted in an image or viewfinder of a camera 111).

The virtual assistant application 116 can attempt to detect smart devices in image data received from a camera 111 of the mobile device 110, e.g., continuously without receiving a user request to identify the smart devices. For example, the virtual assistant application 116 can detect and/or recognize objects in a viewfinder of a camera 111 of the mobile device 110 (based on the image data) and interpret the fact that the user is pointing the camera 111 at the smart device as a request to control the identified smart device.

In some implementations, the virtual assistant application 116 can receive commands to locate and select smart device controls via one or more inputs. For example, the virtual assistant application 116 can receive voice requests from a microphone 113 of the mobile device 110. The virtual assistant application 116 can include a voice recognizer 120 that can receive audio input from the microphone 113 and translate the audio into text (if the audio includes spoken words) and provide the text to the virtual assistant application 116.

In some implementations, the virtual assistant application 116 can receive commands to identify a smart device by a user interacting with (e.g., touching) a button on the interface of the virtual assistant application 116 displayed on the mobile device 110 to initiate the processes described herein.

In some implementations, the virtual assistant application 116 can also receive text requests, e.g., typed in using a physical or touch keypad of the mobile device 110.

The virtual assistant application 116 includes a smart device control selector 130 that determines whether a smart device is present in an image (e.g., in pixel data that represents the image) and selects the user interface controls based on identified smart device, its capabilities, and/or the context in which the smart device is currently operating. In some aspects, the virtual assistant application 116 can receive identified object data 126 from an object recognizer 125 (further described herein) while the virtual assistant application 116 is active. For example, the virtual assistant application 116 can begin obtaining pixel data for the viewfinder from the camera 111 when the virtual assistant application 116 is launched. The smart device control selector 130 can monitor the data until the smart device control selector 130 has enough information to select user interface controls. For example, the smart device control selector 130 can monitor the identified object data 126 for a stream of images, and/or the other data, such as location data 124, until the smart device control selector 130 obtains enough data to make a decision as to whether to present user interfaces controls which controls to select.

In some implementations, the smart device control selector 130 can select the user interface controls based on identified object data 126 generated by the object recognizer 125 based on the image data 123 for the viewfinder of the camera 111. The image data 123 can include pixel data that represents the current scene of the viewfinder of the camera 111. The virtual assistant application 116 can obtain the image data 123 from the camera 111 after the virtual assistant application 116 is launched. For example, the virtual assistant application 116 can obtain a stream of pixel data sets. Each pixel data set can represent the pixels of the viewfinder for a particular point in time. The pixel data in each pixel data set can include data specifying visual characteristics (e.g., color, intensity, brightness, etc.) of each pixel of the viewfinder.

The smart device control selector 130 can select the user interface controls based on whether a smart device (or physical controls for a smart device) is detected in the viewfinder (e.g., in one or more of the pixel data sets) and, if so, the identity of the smart device or the class of the smart device. For example, the virtual assistant application 116 can include an object recognizer 125 that attempts to detect and recognize (e.g., identify) smart devices (or their physical controls) in pixel data (or images). The object recognizer 125 can detect various objects, such as smart speakers, appliances, televisions, physical controls (e.g., light switch, door knob, thermostats, oven/stove controls, etc.), and/or other types of objects using edge detection and/or other object recognition techniques. For some smart devices, the smart device and the physical controls for the smart device may be the same (e.g., a smart thermostat, smart coffee maker, etc.). As described below, the object recognizer 125 can provide to the smart device control selector 130 identified object data 126 that identifies smart devices, if any, identified in the image data 123.

In some implementations, the object recognizer 125 includes a coarse classifier that determines whether a pixel data set includes an object in one or more particular classes (e.g., categories) of objects. For example, the coarse classifier may detect that a pixel data set includes an object of a particular class (e.g., a class of smart devices such as lighting controls), with or without recognizing the actual object. In some aspects, the object recognizer 125 can determine from the image data 123 whether a smart device is in the image data and generate data specific to the identified smart device.

The coarse classifier can detect the presence of a class of objects based on whether or not the image includes one or more features that are indicative of the class of objects. The coarse classifier can include a light-weight model to perform a low computational analysis to detect the presence of objects within its class(es) of objects. For example, the coarse classifier can detect, for each class of objects, a limited set of visual features depicted in the image to determine whether the image depicts an object that falls within the class of objects. In a particular example, the coarse classifier can detect whether an image depicts an object that is classified in one or more of the following classes: smart speakers, appliances, televisions, physical controls (e.g., light switch, door knob, thermostats, oven/stove controls.

In some implementations, the coarse classifier uses a trained machine learning model (e.g., a convolutional neural network) to classify images based on visual features of the images. For example, the machine learning model can be trained using labeled images that are labeled with their respective class(es). The machine learning model can be trained to classify images into zero or more of a particular set of classes of objects. The machine learning model can receive, as inputs, data related to the visual features of an image and output a classification into zero or more of the classes of objects in the particular set of classes of objects.

The coarse classifier can output data specifying whether a class of object has been detected in the image. The coarse classifier can also output a confidence value that indicates the confidence that the presence of a class of object has been detected in the image and/or a confidence value that indicates the confidence that an actual object, e.g., a particular type of smart speaker, is depicted in the image.

As shown in FIG. 1B, for example, a user is pointing the camera 111 of the mobile device 110 at object 115. The object 115 is presumably a smart device for which the user wants the virtual assistant application 116 to generate and present controls. Using the virtual assistant application 116, the user is holding mobile device 110 such that the object 115 is in the field of view of the camera 110 and the object 115 is presented to the user in a user interface 136 of the virtual assistant application 116. For example, the user interface 136 of the virtual assistant application 116 can include a viewfinder for the camera 111. In a particular example, the virtual assistant application 116 can present the viewfinder when the virtual assistant application 116 is in an image mode for which the virtual assistant application 116 can present user interface controls for smart devices detected in the images and/or provides content related to objected detected in images.

Image data 123 representing the scene that is within the field of view of the camera 111 (and that is presented in the viewfinder of the user interface 136) is received by the object recognizer 125. Location data can also be received by smart device control selector 130, e.g., from a Global Positioning System (GPS) receiver of the mobile device 110. The object recognizer 125 can provide, to the smart device control selector 130, identified object data 126 specifying whether an object was detected in the image data 123, and, if an object was recognized (such as a particular smart device), data identifying the recognized object. When a coarse classifier is used, the object recognizer 125 can provide, to the smart device control selector 130, data specifying whether the presence of an object within at least one of the classes of objects has been detected and, if so, the detected class. As described above, the virtual assistant application 116 can receive a stream of pixel data sets. In this example, the object recognizer 125 can evaluate each pixel data set and provide this data (data specifying whether an object was detected and the identity of any recognized objects) to the smart device control selector 130 for each (or at least a portion of) the pixel data sets in the stream.

In some implementations, the object recognizer 125 uses a trained machine learning model (e.g., a convolutional neural network) to recognize objects in image data received from the mobile device 110. For example, the machine learning model can be trained using labeled images that are labeled with their respective smart devices and/or physical controls for smart devices. The machine learning model can be trained to recognize and output data identifying smart devices and/or physical controls for smart devices depicted in images represented by the image data. The machine learning model can receive, as inputs, data related to the visual features of an image and output a data identifying smart devices depicted in the image or smart devices for which physical controls are depicted in the image.

If a smart device is recognized, the smart device control selector 130 can select user interface controls for the recognized smart device based on the actual smart device recognized, the class(es) of smart device(s) detected in the pixel data set, the capabilities of the smart device, and/or the context in which the smart device is operating. For example, if a smart device is detected in the viewfinder (based on a pixel data set for the viewfinder), it is more likely the user is requesting user interface controls based on what is in the viewfinder than if there are no detectable smart devices in the viewfinder. Thus, the smart device control selector 130 can select a user interface control if a smart device or class of smart devices is detected in the pixel data.

Each smart device or class of smart device can include one or more corresponding user interface controls. The user interface controls for each smart device or class of smart devices can be stored in a user interface control index 140. For example, a smart light can have a corresponding user interface control that enables a user to turn the light on and off. A dimmable light may have a different user interface control than a non-dimmable light. For example, the user interface for a dimmable light can include a rotating dimmer or slider bar that a user can adjust to adjust the intensity of the light. If a user points the camera 111 at a toggle light switch and the object recognizer 125 detects that the camera 111 is pointing at a toggle light switch, the smart device control selector 130 can determine that the light is one that can be turned on and off, but not dimmed. Thus, the smart device control selector 130 can select a user interface control that enables the user to turn the light on and off, but not adjust the intensity of the light. Similarly, if the object recognizer 125 recognizes a light dimmer, the smart device control selector 130 can select a user interface control that enables the user to adjust the intensity of the light.

Some smart devices, such as virtual assistant control devices, can perform multiple different tasks or execute multiple applications. The smart device control selector 130 can select user interface controls for these devices based on the context in which the smart device is currently operating. For example, if a smart speaker is playing music when the object recognizer 125 recognizes the smart speaker in the viewfinder for the camera 111, the smart device control selector 130 can select user interface controls for controlling the music, e.g., controls for adjusting the volume, playing different songs, fast forwarding, etc. If the smart speaker is currently controlling an appliance (e.g., an oven), the smart device control selector 130 can select user interface controls that enable the user to control the application (e.g., to change the temperature of the oven).

In some implementations, a smart speaker can have a corresponding user interface for operating the smart speaker. This user interface may correspond to the user interface that is presented by smart speakers that come equipped with a graphical display. For example, some smart speakers may include optional displays. In this example, if the user has a smart speaker that does not have a display, the user interface that corresponds to the user interface that would be presented by the display can be presented by the virtual assistant application 116 when the user points the camera 111 at the smart speaker.

The user interface for a virtual assistant control device (e.g., a smart speaker) can include user interface controls for each smart device registered with the account of the user. For example, the virtual assistant application can select and present user interface controls for controlling the virtual assistant control device in response to recognizing the virtual assistant control device in image data 123 representing the viewfinder of the camera 111 and determining that the mobile device is within a threshold distance of the virtual assistant control device (as described below). These user interface controls can enable the user to select from the smart devices that have been registered with the account of the user. For example, if the user has configured the virtual assistant control device to control a smart oven and a smart light, the user interface controls can enable the user to select either of these devices. In response to the selection, the virtual assistant application 116 can present user interface controls for controlling the selected device. In another example, the virtual assistant application 116 can present a master panel for all (or at least multiple smart devices) that enables the user to control each smart device from the master panel.

In some implementations, the virtual assistant application 116 can enable the user to select from registered smart devices and configure user interface controls for the smart devices to be presented when the virtual assistant control device is recognized in the image data 123. For example, the virtual assistant application 116 can present a list of registered smart devices and enable the user to select from the list. In response, the virtual assistant application 116 can present a user interface control for the selected smart device each time the virtual assistant control device is recognized in the image data 123.

The virtual assistant application 116 can also enable the user to cause presentation of content or user interface controls in response to recognizing other objects in the image data 123. For example, the virtual assistant application 116 can enable the user to configure a dashboard that presents content (e.g., weather information, sports information, financial information, etc. obtained from one or more web pages or other resources) in AR within a user interface of the virtual assistant application 116 whenever a particular wall or other object is detected in the image data 123. In another example, the user can configure the virtual assistant application 116 to present live web pages or applications in AR within a user interface of the virtual assistant application 116 whenever a particular wall or other object is detected in the image data 123. The user can make these configurations by pointing the camera 111 at the wall or particular object, selecting an icon or other user interface control for assigning content to the particular object, and then selecting the content (e.g., by providing one or more URLs, selecting a bookmark, etc.).

In some implementations, a user can register a smart device to be controlled by the virtual assistant application 116 using voice commands in combination with an image of the smart device. For example, the user can point the camera 111 at the smart device and speak a voice command (e.g., this is my stereo). In response, the virtual assistant application 116 can associate the image of the smart device with the name of the smart device (e.g., stereo. If the user points the camera 111 at the smart device, the virtual assistant application 116 can identify user interface controls for the smart device and enable the user to control the smart device using the controls.

In some implementations, the virtual assistant application 116 creates an instance of the smart device for a particular location in response to the voice command. For example, the virtual assistant application 116 can also identify the location of the smart device in response to detecting the voice command and associate the location with the image of the smart device and the name of the smart device. If the user points the camera 111 at the smart device (or a duplicate thereof) when the smart device is in a different location (e.g., greater than a threshold distance from the location of the smart device), the virtual assistant application 116 can determine to not present the user interface controls for the smart device. If the user points the camera 111 at the smart device when the mobile device 110 is near the smart device (e.g., within a threshold distance of the smart device), the virtual assistant application 116 can present the user interface controls for the smart device.

The smart device control selector 130 can also select user interface controls based on a sequence of pixel data sets, e.g., in a stream. For example, if the objects recognized in the pixel data sets change over a short period of time (e.g., 2-5 seconds), it may be likely that the user is moving the mobile device 110 around and not trying to obtain controls for a particular smart device. However, if the same smart device is recognized in a sequence of pixel data sets, it is more likely the user is requesting controls for the particular smart device.

The smart device control selector 130 can also determine whether to present user interface controls and/or select user interface controls based on the location of the mobile device 110, e.g., with respect to the virtual assistant control device. For example, if the mobile device 110 is near the user's virtual assistant control device (e.g., within a threshold distance) when the image is being presented by the mobile device 110, it is likely that the user is requesting controls for the smart device(s) in the viewfinder and a particular user interface control may be selected. If the mobile device is far from the user's virtual assistant control device (e.g., greater than a threshold distance away), it is less likely the viewfinder is viewing a smart device associated with the user. This also prevents the virtual assistant application 116 from presenting user interface controls in situations in which another user's virtual assistant control device is captured in an image incidentally as the virtual assistant application 116 may not be able to control the other user's virtual assistant control device. In this situation, presentation of user interface controls may frustrate the user.

In another example, the user may access a previously captured image so that the user can control a smart device, e.g., from a location remote from the virtual assistant control device. In this example, the smart device control selector 130 can access the location of the mobile device 110 at the time the image was captured. This location may be stored with the image, e.g., as metadata. If the location of the mobile device 110 at the time the image was captured is within a threshold distance of the location of the virtual assistant control device, the smart device control selector 130 can determine that the mobile device 110 can control the smart device recognized in the image and present user interface controls for controlling the smart device.

To determine whether the mobile device 110 is within a threshold distance of the virtual assistant control device, the virtual assistant application 116 can obtain location data for the mobile device 110 from a GPS receiver of the mobile device and obtain location data for the virtual assistant control device either from the virtual assistant control device, from the virtual assistant management system 160, or from an initial configuration of the virtual assistant control device. In an example, the virtual assistant control device can periodically send to the virtual assistant management system 160 data specifying its current location. The virtual assistant application 116 can compare the location of the mobile device 110 to the location of the virtual assistant control device to determine whether the mobile device 110 is within a threshold distance of the virtual assistant control device.

The smart device control selector 130 can also determine whether to present user interface controls for a smart device based on whether a smart device that matches the recognized smart device has been registered with an account of the user (e.g., a virtual assistant account of the user). In this way, the virtual assistant application 116 does not present user interface controls for a smart device that the virtual assistant application 116 has not been set up to control. For example, a user can use the virtual assistant application 116 to register smart devices for control by a virtual assistant control device, such as a smart speaker at the user's home. The virtual assistant application 116 can store data about each registered smart device locally, e.g., in the control index 140 or another index. The data can include the name of the device, the class of device, the capabilities of the device, how the device is controlled, e.g., via a wireless connection between the virtual assistant control device and the device, and/or other appropriate data. In some implementations, the data for the devices can also include an image of the device and/or an image of a physical control for controlling the device. The virtual assistant application 116 can also provide the data to a virtual assistant management system 160 that manages virtual assistant accounts of users.

The smart device control selector 130 can also select user interface controls based on the location of the mobile device 110, e.g., the geographic location of the mobile device 110. For example, the mobile device 110 can include a GPS receiver that determines the geographic location of the mobile device 110, and provide the virtual assistant application 116 location data 124 specifying the location of the mobile device 110. The smart device control selector 130 can use the geographic location to determine if the mobile device is at a known location, such as their home, at which a virtual assistant control device of the user is located, or other area where the user has a registered virtual assistant control device. When the mobile device 110 is at (or within a threshold distance from) one of these locations, such as a home network associated with a virtual assistant control device, the smart device control selector 130 can register an identified smart device with the virtual assistant control device if they are each associated with the same network.

The smart device control selector 130 can select user interface controls for controlling an identified smart device based on the user's history of using user interface controls for an identified smart device or similar smart device. The smart device control selector 130 can also select user interface controls for the identified smart device based on preferences for user interface controls specified by the user. For example, a user can select which user interface control the user prefers for particular circumstances. In a particular example, the virtual assistant application 116 can generate various user interface controls for a same object or same class of object. The user can select between the various user interface controls and the virtual assistant application 116 can store the selection for the user.

According to some aspects, the virtual assistant application 116 can send the image data 123 and/or location data 124 to a virtual assistant management system 160 over the network 150 to perform one or more of the processes discussed herein. For example, with the image data 123 and location data 124, the virtual assistant management system 160 can determine if the received image data depicts a smart device, determine that a location of the mobile device 110 at the time the image data 123 was captured is within a threshold distance of a location of a virtual assistant control device (e.g., smart speaker) registered with an account of the user, and select one or more user interface controls for controlling the smart device if the mobile device 110 was within the threshold distance of the virtual assistant control device. The virtual assistant application 116 can send one or more pixel data sets to the virtual assistant management system 160. The pixel data set(s) can include pixel data for the viewfinder used to select the smart device control and/or pixel data sets captured after the image smart device control is selected. For example, the virtual assistant application 116 can first send the pixel data set(s) used to select the smart device control. If the viewfinder is later pointing at a different smart device, the virtual assistant application 116 can send pixel data for the different smart device to the virtual assistant management system 160.

The virtual assistant management system 160 includes one or more front-end servers 161 and one or more back-end servers 162. The front-end servers 161 can receive the data from the mobile devices 110 and provide the data to the back-end servers 162. The front-end servers 161 can also send content to the mobile devices 110 in response to receiving the data.

The back-end servers 162 include a smart device control selection engine 165 that selects and provides user interface controls to mobile devices 110 based on the data received from the mobile devices 110. As used herein, the term engine refers to a data processing apparatus that performs a set of tasks. The smart device control selection engine 165 can select user interface controls from a smart device controls storage unit 166 (e.g., one or more hard drives, flash memory, etc.) that stores the user interface controls for a plurality of smart devices and/or classes of smart devices. The smart device control selection engine 165 can perform the same operations as, or similar operations as, the object recognizer 125 and the smart device control selector 130 of the virtual assistant application 116. For example, the smart device control selector engine 165 can include an object recognition module that can determine whether the image data 123 includes a smart device (or physical controls for a smart device) and, if so, select user interface controls for the recognized smart device.

Figure 2:
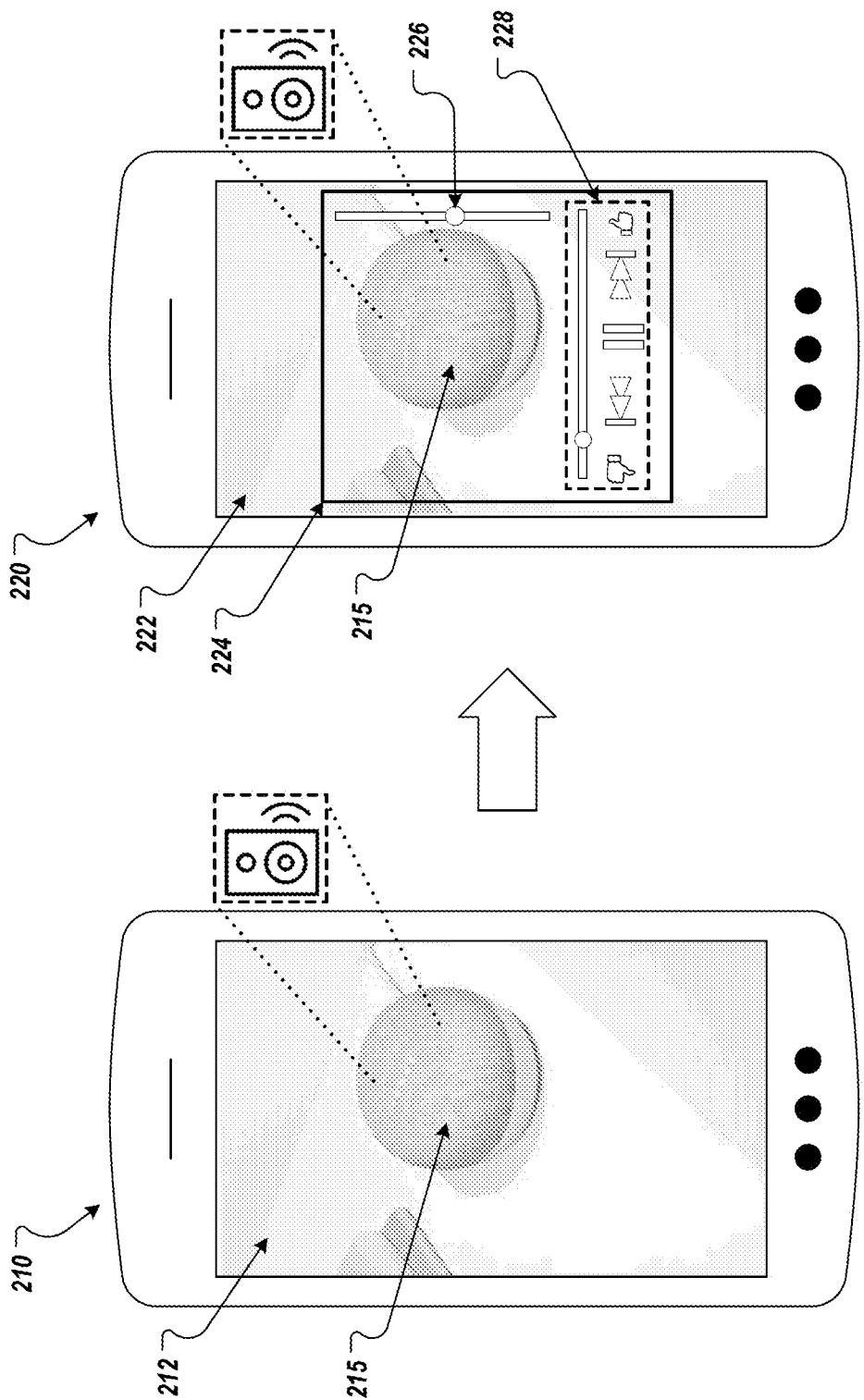
FIG. 2 is a sequence of example screen shots of a mobile device that present one or more user interface controls for controlling an identified smart device based on received image data.
Figure 3:
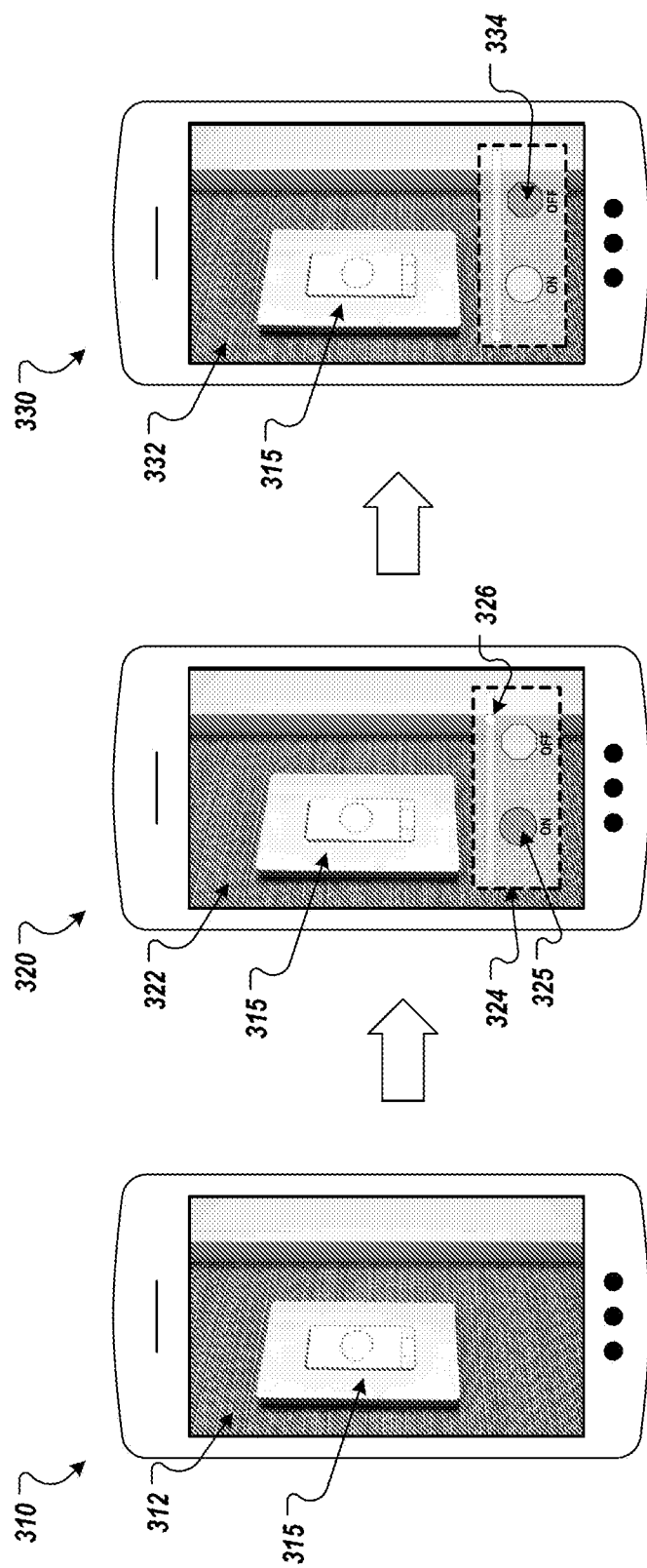
FIG. 3 is another sequence of example screen shots of a mobile device that present one or more user interface controls for controlling an identified smart device based on received image data.

For example, if the image data 123 received from a mobile device 110 represents an image of a virtual assistant control device (e.g., a smart speaker), and the audio received from a mobile device 110 represents music, the smart device control selection engine 165 can identify the smart device controls represented by the voice assistant device and select smart device controls for audio (e.g., adjustable volume toggle, forward, backward, title, like/dislike buttons, and the like, as shown on FIG. 2) related to the particular voice assistant device. If the image data 123 received from a mobile device 110 represents an image of a light or a light controller (e.g., physical light switch), the smart device control selection engine 165 can select user interface controls for controlling the light (e.g., a virtual adjustable dimmer toggle, ON/OFF buttons, and the like, as shown in FIG. 3.

In some embodiments, the particular smart device that the smart device control selection engine 165 is generating user interface controls for, is determined to be registered to an account of the user of mobile device 110 which is a registered user of the virtual assistant control device, and the user interface controls are associated to the voice activated controls that the virtual assistant control device is able to control.

The back-end servers 162 also include an account management engine 167 that manages accounts of users. The account management engine 167 can store, for each user that has an account, registration data 168 specifying virtual assistant control devices of the user and smart devices that have been registered to be controlled by the virtual assistant control devices. The account management engine 167 can receive the data from the virtual assistant application 116 of each user. The registration data for each smart device can include the name of the device, the class of device, the capabilities of the device, how the device is controlled, e.g., via a wireless connection between the virtual assistant control device and the device, an image of the device, and/or an image of a physical control for controlling the device.

The back-end servers 162 can provide user interface controls selected by the smart device control selection engine 165 to the front-end servers 161. The front-end servers 161 can, in turn, provide the smart device controls to the mobile device 110 from which the data used to select the smart device controls was received.

In some embodiments, the back-end servers 162 can include a smart device registration engine that selects and provides registration files to mobile devices 110 in response to the data received from the mobile devices 110. The smart device registration engine can select registration files for a plurality of smart devices. For example, if the smart device control selection engine 165 can identify a smart device represented in the pixel data, the smart device registration engine can determine if a registration file is associated to that smart device with an account of the user of the mobile device 110. For example, original equipment manufacturers (OEMs) for the smart devices can require the user to register the device through their home network. In some embodiments, the OEM can associate and register the smart device through a virtual assistant control device of the user, or the smart device can be accessed by a native application or web browser managed by the OEM. In some aspects, the virtual assistant management system 160 can store registration files that the OEM allows to be accessed through a user's home network.

In some embodiments, the virtual assistant management system 160, can allow particular mobile devices 110 to control a smart device through the virtual assistant application 116 without an associated virtual assistant control device by determining if a particular smart device is registered to an account of the user of the mobile device 110. In some implementations, the user may need to be granted permissions in the registration file to access that particular smart device. For example, a user may setup a smart device light controller through an OEMs setup process without connecting through a virtual assistant control device. The virtual assistant application 116 can access the smart device registration engine and retrieve the registration file associated with the identified smart device, and based on the location data 124 of the mobile device 110 and the account information associated with the user in the registration file, control the smart device light controller. In some embodiments, the virtual assistant application can store the registration file on the mobile device.

The virtual assistant application 116 includes a user interface generator 135 that generates and presents graphical user interfaces. The user interfaces can include user interface controls for controlling smart devices that have been recognized in image data 123 represented in the viewfinder for the camera 111. As discussed above, the user interfaces of the virtual assistant application 116 can present the viewfinder for the camera 111. As shown in FIG. 1B, the smart device control selector 130, after selecting one or more user interface controls for controlling the smart device, generates and sends interface controls identification data 131 to the user interface generator 135. The interface controls identification data 131 includes data for the selected user interface controls (e.g., different types of controls, different icons used as controls, different layouts, etc.) that the interface generator 135 can use to present the selected user interface controls. The user interface generator 135 generates, updates, and presents user interfaces 136 at a display of the mobile device 110 based at least in part on the interface controls identification data 131. For example, the user interface generator 135 can present the selected user interface controls over a live image (e.g., in the viewfinder of the camera 111).

The user interface generator 135 can generate presentation data 138 that define the user interface and output the presentation data 138 to the display 145 of the mobile device 110. The presentation data 138 can include data that causes the display to present the user interface controls at a particular location in the user interface 135. For example, the presentation data 138 can specify the location (e.g., using pixel coordinates) at which the user interface controls are to be presented in the user interface 136. The location of the user interface controls may be presented near the recognized smart device, e.g., below or adjacent to the recognized smart device in the viewfinder. In another example, the user interface controls may be presented below of adjacent to the viewfinder.

The user can then interact with the user interface controls to control the smart device. In some implementations, the virtual assistant application 116 detects the user interactions and provides data specifying the user interactions to the virtual assistant control device of the user. For example, the mobile device 110 can transmit the data to the virtual assistant control device over a wireless network. The virtual assistant control device can then control device over a wireless network. In another example, the virtual assistant control device can send control data to the virtual assistant management system 160 which, in turn, controls the smart device based on the control data, e.g., by sending the control data to the smart device over the network 150.

In some implementations, the virtual assistant application 116 sends the control data to the virtual assistant management system 160 over the network 150, e.g., without sending data to the virtual assistant control device. The virtual assistant management system 160 can then send the control data to the smart device as discussed above.

In some implementations, the virtual assistant application 116 can allow multiple users to communicate with each other and leave messages or other content media for communication purposes on an identified object. For example, users of the same home network (or same virtual assistant account) can register an identified object, such as a refrigerator, and place a virtual note (e.g., using augmented reality techniques) for another user or multiple users to access and view within the viewfinder using the virtual assistant application 116. In some embodiments, a user can specify a particular user to have access to the virtual note, or a user can allow anyone on the home network to view the virtual note.

FIG. 2 depicts a sequence of example screen shots 210 and 220 of a mobile device that presents one or more user interface controls for controlling an identified smart device based on received image data. The first screen shot 210 depicts an example user interface 212 of the mobile device. In this example, a user is viewing a voice assistant device 215 (e.g., a smart speaker) through a viewfinder of a camera that is presented in the user interface 212, and the voice assistant device 215 is playing music. The user interface 212 can be generated and presented by a virtual assistant application, e.g., the virtual assistant application 116 of FIG. 1.

The second screen shot 220 presents a user interface 222 for the virtual assistant application 116. In this example, the user interface 222 presents user interface controls 224 overlaid on the current view of the user interface 222. In particular, the user interface controls 224 presents a window around the identified object, which in this example, is the voice assistant device 215. The virtual assistant application 116 can identify the voice assistant device 215 from image data representing the viewfinder. As described above, the virtual assistant application 116 can also determine whether to present user interface controls for the voice assistant device based on whether the location of the mobile device is within a threshold distance of the location of the user's voice assistant device.

Within the user interface controls 224, there are a number of example smart device controls for controlling the audio of the music. Specifically, a volume toggle bar 226 is shown to control the volume level of the voice assistant device 215. Further, the music control buttons 228 are shown with several different options that could be presented to a user, including, but not limited to, a pause/play button, like and dislike buttons, previous song button, next song button, and a placeholder toggle bar to move to a particular point in the audio currently being played. The options of the music control buttons 228 may be dependent on the particular music application being used by the voice assistant device 215. In some aspects, the available buttons may be generic to all music playing applications. In some aspects, the buttons may be customized to specific music playing applications and can be updated by the virtual assistant management system 160.

The virtual assistant application 116 can select music controls based on the context of the voice assistant device 215. For example, the virtual assistant application 116 can communicate with the voice assistant device 215 and request the current mode of operation, the current task being performed by the voice assistant device 215, or an application currently in use (e.g., a music application) by the voice assistant device 215. The voice assistant device 215 can provide to the virtual assistant application 116 data specifying the current mode of operation or the current task being performed and, in turn, the virtual assistant application 116 can select user interface controls that enable the user to control the current mode of operation or current task. In this example, the voice assistant device 215 is playing music and the virtual assistant application 116 selected music controls in response receiving data specifying that the voice assistant device 215 is playing music. In some implementations, the virtual assistant application 116 can determine that the voice assistant device 215 is playing music based on detected audio.

If the user interacts with (e.g., selects) the music control buttons 228, the virtual assistant application 116 can communicate with the voice assistant device 215 to control the music playing application. According to some aspects, if the user moves the viewfinder away from the voice assistant device 215, the virtual assistant application 116 would remove the user interface controls 224 from the user interface 222 because it no longer detects a smart device in the image data, specifically the voice assistant device 215. In some aspects, the virtual assistant application 116 can freeze the image of the voice assistant device 215 in the user interface 222. For example, the virtual assistant application 116 can present a lock screen or lock image button to the user that, when interacted with, causes the virtual assistant application 116 to freeze the image. In this example, the user can move the mobile device 110 without having to point the camera directly at the smart device, but can continue to control the smart device using the user interface controls 224. In some implementations, the virtual assistant application 116 can freeze the image in response to user interaction with one of the controls as this shows that the user wants to use the controls to control the voice assistant device 215.

In some aspects, the user interface controls 224 can present content or an animation that indicates that the virtual assistant application 116 is attempting to identify content. For example, the user interface 222 can present a throbber animation that animates in a loop or another animation that signals that the virtual assistant application is identifying smart device controls for presentation to the user.

FIG. 3 depicts another sequence of example screen shots 310, 320, and 330 of a mobile device that presents one or more user interface controls for controlling an identified smart device based on received image data. The first screen shot 310 depicts an example interface 312 of the mobile device. In this example, a user is viewing a physical control 315 for a smart device through the viewfinder. In this example, the smart device is a smart light and the physical control 315 is a light switch.

The second screen shot 320 and the third screen shot 330 present user interfaces 322 and 332, respectively, for the virtual assistant application 116. In these examples, the user interfaces 322 and 332 present user interface controls 324 overlaid on the current view of the user interface 322. In particular, the user interface controls 324 presents a window below the physical control 315 for the smart light. The virtual assistant application 116 identified the physical control 315 from image data representing the viewfinder for the camera of the mobile device. As shown, within the user interface controls 324, there are three example smart device controls for controlling the lighting of smart device 315. As shown, screen shot 320 shows the smart device 315 with the lighting control as initially being selected as "ON" by the user previously (or represents the current state of the smart light). In some examples, the user can select the "ON" toggle button 325 to turn on the light control. If the user of the mobile device chooses to use the virtual assistant application 116 to turn off the light, as shown in screen shot 330, the user selects the "OFF" toggle button 334. Further, a dimming toggle bar 326 is shown to control the dimming level of the smart light.

In these examples, the smart device 315 has been registered with an account of the user and can communicate with and be controlled by a virtual assistant control device, such as voice assistant device 215 in FIG. 2. The virtual assistant application 116 would receive image data from a camera of a mobile device of a user and determine that the received image data depicts a smart device. Next, the virtual assistant application 116 can determine that a location of the mobile device at the time the image data was captured is within a threshold distance of a location of the virtual assistant control device, such as voice assistant device 215 in FIG. 2. Further, the virtual assistant application 116 can identify one or more user interface controls for controlling the smart device, and present the one or more user interface controls (i.e., interface controls 324) for controlling the smart device.

According to some aspects, the available buttons may be generic to all lighting control smart devices. In some aspects, the buttons may be customized to specific lighting control smart devices and can be updated by the virtual assistant management system 160.

According to some aspects, if other smart device controls are available (e.g., a second smart device such as a second light controller is in the image data), the user interface 322 can include user interface controls that allow the user to select the other smart device controls.

According to some aspects, the smart device in the image data is a timer or a clock of an appliance, such as a stove or a microwave. In this example, the virtual assistant application 116 could present user interface controls for setting the timer, or provide easy controls to quickly change the time of the clock or set an alarm of the smart device.

According to some aspects, the smart device in the image data is a digital dashboard application that is presented on a display device or projected on a background. For example, a smart device could use a projector on a living room wall that presents a virtual dashboard (e.g., weather, news, sports, finance, and the like). A mobile device would acquire the image data of the dashboard, and provide the data to the virtual assistant application 116 which could then provide interface controls to update or change the dashboard.

Figure 4:
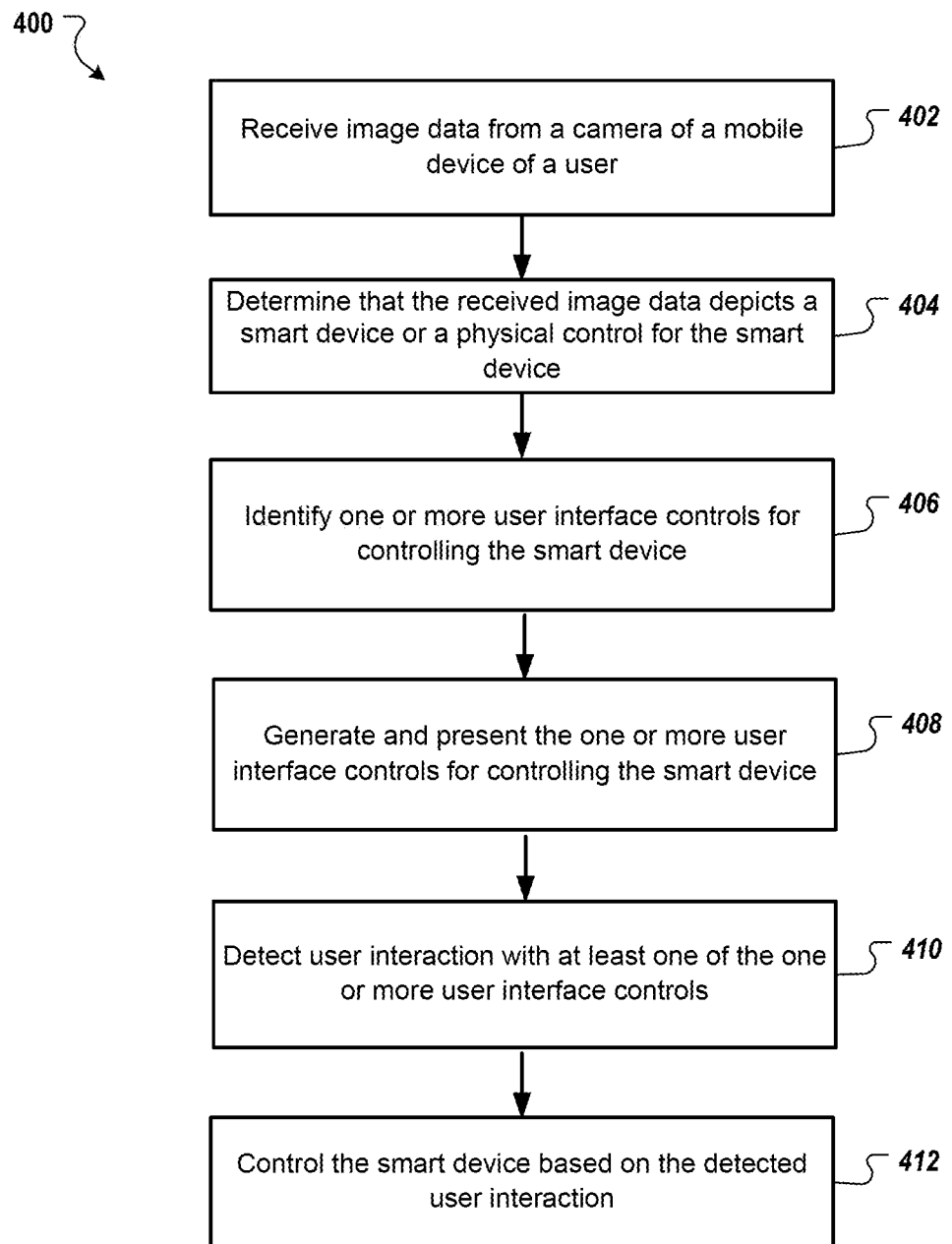
FIG. 4 is a flow diagram of an example process for using a virtual assistant application to identify a smart device and present one or more user interface controls for controlling the identified smart device.

FIG. 4 is a flow diagram of an example process 400 for using a virtual assistant application to identify a smart device and present one or more user interface controls for controlling the identified smart device. Operations of the process 400 can be performed, for example, by one or more data processing apparatus, such as the mobile device 110 of FIGS. 1A and 1B. Operations of the process 400 can also be implemented as instructions stored on a non-transitory computer readable medium. Execution of the instructions cause one or more data processing apparatus to perform operations of the process 400.

Image data from a camera of a mobile device of a user is received (402). As described herein, the object recognizer 125 of the virtual assistant application 116 can receive pixel data (e.g., image data 123 as shown in FIG. 1B) for the viewfinder of the camera of a mobile device. The image data can be a single image or continuous images, such as streaming live video.

After image data is received from the camera of a mobile device, a determination is made as to whether the received image data depicts a smart device or a physical control for a smart device (404). The smart device can be a virtual assistant control device (e.g., a voice assistant device) or another type of smart device. For example, the smart device can be a smart device that is capable of being controlled by the virtual assistant control device, e.g., by registering the smart device with a virtual assistant account of the user or otherwise configuring the virtual assistant control device to control the smart device. As described above, a virtual assistant application on the mobile device can make the determination if a smart device or physical control for a smart device is depicted in the image data. In some aspects, the image data can be analyzed by a remote system, e.g., a virtual assistant management system, and the results sent back to the mobile device.

According to some aspects, if a smart device is determined to be depicted in the image data, a determination is made as to whether the mobile device at a time the image is presented at the mobile device is able to control a virtual assistant control device registered with an account of the user. For example, the determination can be based on whether the mobile device at the time the image is presented is within a threshold distance of the virtual assistant control device. As described above, the mobile device can send location data to the virtual assistant application which can then determine if a virtual assistant control device (e.g., a voice assistant device) is in close proximity, or within a predetermined distance of the location of the mobile device. For example, the virtual assistant application can compare the location of the mobile device to the location of the virtual assistant control device. The location of the virtual assistant control device can be a specified location (e.g., determined when the virtual assistant control device is initially registered). In another example, the virtual assistant control device can transmit data identifying its current location (e.g., using a GPS receiver installed on or in the virtual assistant control device) to the mobile device or to a virtual assistant management system (from which the virtual assistant application can obtain the location data). The location data and the determination of whether the smart device is within a certain distance of a user's virtual assistant control device can be made by a remote system, e.g., a virtual assistant management system, with the determination being sent back to the mobile device.

According to some aspects, determining that the received image depicts a smart device registered with an account of the user includes determining that the image data depicts an image of the virtual assistant control device of the user. According to some aspects, the virtual assistant control device comprises a virtual assistant smart speaker device that receives voice commands from the user and provides information to the user using a speaker of the virtual assistant smart speaker device.

According to some aspects, determining that the received image depicts a smart device registered with an account of the user includes determining that the image depicts a smart device that is controlled by a virtual assistant control device of the user. For example, the virtual assistant application can communicate with voice assistant device to determine what smart devices it has control over, such as what smart devices with which the voice assistant device has been paired.

According to some aspects, determining that the received image depicts a smart device registered with an account of the user includes obtaining data specifying smart devices that have been registered with a virtual assistant account of the user, e.g., smart devices for which the user has configured the virtual assistant control device to control. If the smart device (or physical control) identified in the image matches a registered smart device (or a physical control for a registered smart device), the virtual assistant application can determine that the user is pointing the camera of the mobile device at the registered smart device.

One or more user interface controls for controlling the smart device are identified in response to determining that that the image depicts at least one of a smart device or a physical control for the smart device (406). As described above, after the smart device control selector determines that a location of the mobile device at the time the image data was captured is within a distance of a location of a virtual assistant control device registered with an account of the user, the smart device control selector identifies one or more user interface controls for controlling the smart device and generates interface controls identification data. The interface controls identification data includes data that specifies certain controls that can control the identified smart device. The user interface controls can be selected by a remote system, e.g., a virtual assistant management system, and sent to the mobile device.

According to some aspects, identifying one or more user interface controls for controlling the smart device includes determining a task or service the virtual assistant control device is currently performing and selecting one or more user interface controls for controlling the particular task or service. For example, if the virtual assistant control device is a smart speaker and the smart speaker is controlling an appliance, controls for controlling the appliance may be selected.

One or more user interface controls for controlling the smart device is generated and presented to a user of the mobile device (408). As described above, the interface controls identification data is received by an interface generator, for each user interface control(s) specified by the interface controls identification data to belong to the smart device of interest, the interface generator generates presentation data that presents the user interface controls superimposed on the user interface on the mobile device. In some aspects, for continuous video (e.g., a live feed), the user interface controls are superimposed on the user interface only while the smart device is identified in the image data. The user interface controls can be selected by a remote system, e.g., a virtual assistant management system, and sent as presentation data to the mobile device for display.

User interaction with at least one of the one or more user interface controls is detected at the display of the mobile device (410). For example, the virtual assistant application can detect the interactions and determine a corresponding action to perform based on the interactions.

Based on the detected user interaction with at least one of the one or more user interface controls, the smart device is controlled (412). As described above, if a user interacts with the interface controls, the user is able to control the particular smart device based on the user interaction. For example, if a music application is running on a smart speaker, a user can control the application (e.g., volume level, skip to the next track, etc.) by interacting with the interface controls presented to the user on the display of the mobile device.

The mobile device can control the smart device directly, e.g., by sending control data to the smart device over a wireless network. If the smart device is controlled by a virtual assistant control device, the mobile device can send the control data to the virtual assistant control device. In turn, the virtual assistant control device can control the smart device.

In some aspects, presenting the one or more user interface controls for controlling the smart device includes superimposing the one or more user interface controls in augmented reality over a field of view of a viewfinder of a camera of the mobile device. For example, as shown in FIG. 2, music control buttons 228 are volume toggle bar 226 are user interface controls shown in augmented reality over the viewfinder of a camera of the mobile device that a user can select to control the music playing application of the voice assistant device 215.

In some aspects, for continuous video (e.g., a live feed), the user interface controls are superimposed on the user interface only while the smart device is identified in the image data. In some aspects, a still frame shot of the smart device can be captured and used to control the smart device so the mobile device would not have to be required to continuously acquire image data of the smart device to control it. For example, the user may desire to take a snap shot of a voice assistant device, then move away from the voice assistant device and run the virtual assistant application to generate the user interface controls to control the voice assistant device.

Figure 5:
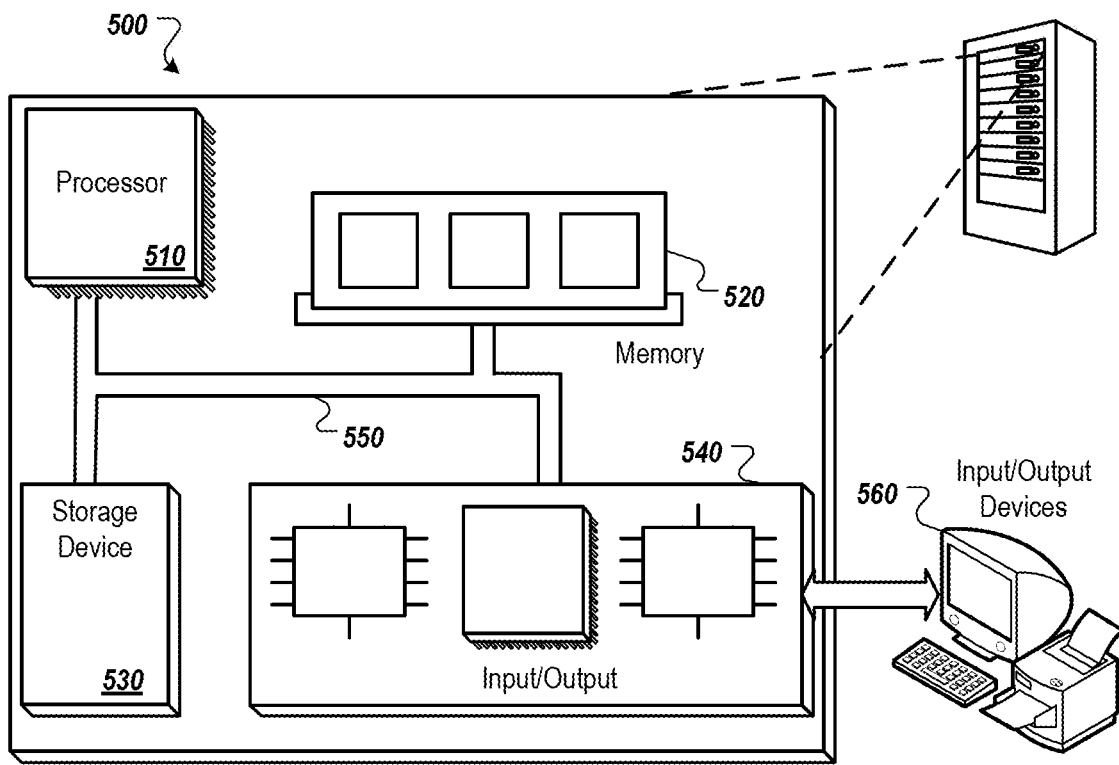
FIG. 5 is a block diagram of an example computer system that can be used to implement the methods, systems and processes described in this disclosure.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by one or more data processing apparatus, the method comprising:
   receiving, by the one or more data processing apparatus, image data for an image captured by a camera of a mobile device of a user;
   determining, by the one or more data processing apparatus based on the image data, that the image depicts a smart device;
   in response to determining that the image depicts a smart device, obtaining, by the one or more data processing apparatus via an established wireless connection, a registration file of the smart device that indicates the smart device is not registered with the mobile device of the user, the registration file comprising smart device identification data and smart device control data;
   sending, by the one or more data processing apparatus based on the smart device identification data, user device identification data to the smart device via the established wireless connection; and
   storing, by the one or more data processing apparatus, the registration file to register the mobile device of the user to the smart device.

2. The computer-implemented method of claim 1, wherein sending, by the one or more data processing apparatus based on the smart device identification data, the user device identification data to the smart device via the established wireless connection further comprises sending, by the one or more data processing apparatus, the user device identification data to a second smart device communicatively coupled to the smart device.

3. The computer-implemented method of claim 2, further comprising sending, by the one or more data processing apparatus, the registration file to the second smart device communicatively coupled to the smart device to register the smart device with the second smart device.

4. The computer-implemented method of claim 3, wherein the second smart device comprises a virtual assistant control device.

5. The computer-implemented method of claim 1, wherein determining, by the one or more data processing apparatus based on the image data, that the image depicts the smart device further comprises determining, by the one or more data processing apparatus, that the mobile device of the user is located within a registration distance of the smart device.

6. The computer-implemented method of claim 1, wherein the established wireless connection comprises a wireless connection between the mobile device of the user and the smart device.

7. The computer-implemented method of claim 1, further comprising:
   providing, by the one or more data processing apparatus, one or more user interface controls for display at the mobile device of the user, wherein the one or more user interface controls are based at least in part on the smart device control data;
   in response to providing the one or more user interface controls, receiving, by the one or more data processing apparatus, data indicative of a user interaction with at least one of the one or more user interface controls; and
   controlling, by the one or more data processing apparatus, the smart device based at least in part on the data indicative of the user interaction with the at least one of the one or more user interface controls.

8. The computer-implemented method of claim 1, wherein determining, by the one or more data processing apparatus based on the image data, that the image depicts the smart device further comprises establishing, by the one or more data processing apparatus, a communicative network connection between the smart device and the user device.

9. A computing system, comprising:
   one or more processors; and
   one or more tangible, non-transitory computer readable media storing computer-readable instructions that when executed by the one or more processors cause the one or more processors to perform operations, the operations comprising:
   receiving image data for an image captured by a camera of a mobile device of a user;
   determining, based on the image data, that the image depicts a smart device;
   in response to determining that the image depicts a smart device, obtaining a registration file of the smart device via an established wireless connection that indicates the smart device is not registered with the mobile device of the user, the registration file comprising smart device identification data and smart device control data;
   sending, based on the smart device identification data, user device identification data to the smart device via the established wireless connection; and
   storing the registration file to register the mobile device of the user to the smart device.

10. The computing system of claim 9, wherein sending, based on the smart device identification data, the user device identification data to the smart device via the established wireless connection further comprises sending the user device identification data to a second smart device communicatively coupled to the smart device.

11. The computing system of claim 10, wherein the operations further comprise sending the registration file to the second smart device communicatively coupled to the smart device to register the smart device with the second smart device.

12. The computing system of claim 11, wherein the second smart device comprises a virtual assistant control device.

13. The computing system of claim 9, wherein determining, based on the image data, that the image depicts the smart device further comprises determining that the mobile device of the user is located within a registration distance of the smart device.

14. The computing system of claim 9, wherein the established wireless connection comprises a wireless connection between the mobile device of the user and the smart device.

15. The computing system of claim 9, wherein the operations further comprise:
   providing one or more user interface controls for display at the mobile device of the user, wherein the one or more user interface controls are based at least in part on the smart device control data;
   in response to providing the one or more user interface controls, receiving data indicative of a user interaction with at least one of the one or more user interface controls; and
   controlling the smart device based at least in part on the data indicative of the user interaction with the at least one of the one or more user interface controls.

16. The computing system of claim 9, wherein determining, based on the image data, that the image depicts the smart device further comprises establishing a communicative network connection between the smart device and the user device.

17. One or more tangible, non-transitory computer readable media storing computer-readable instructions that when executed by one or more processors cause the one or more processors to perform operations, the operations comprising:
   receiving image data for an image captured by a camera of a mobile device of a user;
   determining, based on the image data, that the image depicts a smart device;
   in response to determining that the image depicts a smart device, obtaining a registration file of the smart device via an established wireless connection that indicates the smart device is not registered with the mobile device of the user, the registration file comprising smart device identification data and smart device control data;
   sending, based on the smart device identification data, user device identification data to the smart device via the established wireless connection; and
   storing the registration file to register the mobile device of the user to the smart device.

18. The one or more tangible, non-transitory computer-readable media of claim 17, wherein sending, based on the smart device identification data, the user device identification data to the smart device via the established wireless connection further comprises sending the user device identification data to a second smart device communicatively coupled to the smart device.

19. The one or more tangible, non-transitory computer-readable media of claim 18, wherein the operations further comprise sending the registration file to the second smart device communicatively coupled to the smart device to register the smart device with the second smart device.

20. The one or more tangible, non-transitory computer-readable media of claim 19, wherein the second smart device comprises a virtual assistant control device.

* * * * *